United States Patent Office 2,808,388
Patented Oct. 1, 1957

2,808,388

HYDROSOLS OF ACRYLIC ESTERS AND HYDROPHOBIC MONOMERS POLYMERIZED WITH CATIONIC OR AMPHOLYTIC HYDROPHILIC COPOLYMERS AND PROCESS FOR MAKING SAME

Richard J. Hellmann, Rochester, N. Y., assignor to Eastman Kodak Company, Rochester, N. Y., a corporation of New Jersey No Drawing. Application July 29, 1955,
Serial No. 525,358

16 Claims. (Cl. 260—45.5)

This invention relates to hydrosols which are compatible with or substitutes for natural hydrophilic colloids such as gelatin, and is particularly concerned with hydrosols prepared by copolymerizing a mixture of hydrophobic monomers including an alkyl acrylate or methacrylate together with a styrene, an acrylonitrile, a butadiene, or vinylidene chloride in the presence of an aqueous solution of a copolymer of methacrylamide or methacrylic acid and a salt of a basic monomer.

The naturally occurring hydrophilic colloids, such as gelatin, have found wide application in various manufactures, particularly in the photographic field where a water-permeable colloid emulsion or layer is essential. The nonuniformity of such colloids as well as their brittleness when coated to layers of appreciable thickness has limited their utility to some extent. Attempts have therefore been made to improve gelatin and similar colloids by addition of elastic materials or other modifying agents, and attempts have also been made to completely replace the natural colloids with synthetic resins. A number of hydrosols of synthetic resins have been prepared by various aqueous emulsion polymerization methods. For the most part, however, the prior art processes have entailed the use of a conventional type of surfactant which remains in the hydrosol (such as sodium lauryl sulfate, sodium oleate, cetyl trimethyl ammonium chloride, etc.). For certain applications, the presence of surfactants of this kind in a hydrosol is decidedly detrimental. This is particularly true where the hydrosol is intended for use as a gelatin additive or substitute in relatively sensitive photographic emulsions or other photographic applications. For example, many hydrosols prepared with conventional surfactants have caused serious difficulties such as instability, graininess, and the like of emulsions intended for the preparation of photographic materials. It would therefore be very desirable to provide improved hydrosols of readily reproducible synthetic resins having properties similar to gelatin and highly compatible therewith for addition to aqueous gelatin solutions or as substitutes for gelatin, and free of the disadvantages of hydrosols prepared heretofore with conventional surfactants.

It is accordingly an object of this invention to provide a new class of synthetic resin hydrosols.

It is a further object of the invention to provide new and improved hydrosols which are devoid of any added surfactant other than the components making up the resins themselves, and which are free of the disadvantages normally inherent in hydrosols containing conventional surfactants.

Another object of the invention is to provide new and improved hydrosols which can be readily employed as gelatin additives or substitutes, and which are compatible with gelatin over a wide range of concentrations and pH.

Another object of the invention is to provide polymeric hydrosols which can be admixed with gelatin or employed alone to give coatings which, when dried, form continuous layers of the requisite photographic clarity and of improved flexibility as compared with gelatin alone.

Another object is to provide methods for preparing such hydrosols which are especially useful in photographic materials and processes.

Other objects will be apparent from the description and claims which follow.

These and other objects are attained by means of this invention, wherein improved hydrosols are prepared by copolymerizing a mixture of hydrophobic monomers in which one of the monomers is an alkyl acrylate or methacrylate, and the other monomer or monomers is a styrene, an acrylonitrile, a butadiene, or vinylidene chloride, in the presence of aqueous solutions of certain hydrophilic cationic or ampholytic copolymers, and in the absence of any other surfactant, the hydrophilic copolymers acting as the surfactant for the polymerization. The hydrophilic copolymer can be either a cationic copolymer prepared by copolymerizing methacrylamide with a salt of a basic monomer, or it can be an ampholytic copolymer prepared by copolymerizing methacrylic acid with such salt of a basic monomer. The salt is ordinarily a hydrochloride of a vinyl pyridine monomer (including either unsubstituted vinyl pyridines or alkyl substituted vinyl pyridines) or an N,N-dialkyl aminoethyl acrylate. The hydrosols thereby obtained are entirely free from the above-mentioned disadvantages of prior art materials and are particularly adapted for use as gelatin additives or replacements in many photographic materials. Not all hydrophilic polymers can be used in the process embodying the invention to give satisfactory hydrosols. For example, hydrophilic polymers such as polyacrylic acid, polymethacrylic acid, copolymers of acrylamide and acrylic acid, and copolymers of methacrylamide and methacrylic acid do not give satisfactory hydrosols with the above-mentioned hydrophobic monomer mixtures. Particularly useful hydrosols are obtained by copolymerizing alkyl acrylates or methacrylates wherein the alkyl group contains 1–4 carbon atoms with styrene or acrylonitrile, in the presence of an aqueous solution of either the cationic or ampholytic hydrophilic copolymers defined herein. The alkyl acrylates, in particular, are best suited for copolymerization with styrene or acrylonitrile in the presence of the hydrophilic copolymer, n-butyl acrylate being preferred. Although the invention has thus far been described in general terms, the improved results characteristic of this invention are obtained only with the relative proportions and concentrations as hereinafter defined.

In accordance with the invention, the hydrosols embodying the invention are prepared by heating a mixture of water, a polymerization catalyst, a copolymer of 20–80% by weight of methacrylamide or methacrylic acid and 80–20% by weight of a salt of a basic monomer which can be either a vinyl pyridine or an N,N-dialkyl aminoethyl acrylate (wherein each alkyl group contains 1–2 carbon atoms) and a mixture of monomers consisting of 10–90% by weight of an alkyl acrylate or methacrylate wherein each alkyl group contains 1–4 carbon atoms and 90–10% by weight of a hydrophobic monomer which can be styrene, a substituted styrene, acrylonitrile, a substituted acrylonitrile, butadiene, or similar diolefinic hydrocarbon, or vinylidene chloride. The hydrophilic copolymer, which can be either ampholytic or cationic, is used in amounts of 5–40%, and the mixture of monomers is employed in amounts of 60–95% of the combined weight of the copolymer and monomers.

In accordance with the invention, the hydrophilic copolymer is first prepared by heating the mixture of methacrylamide or methacrylic acid and the basic monomer salt in water, preferably in the presence of a peroxide polymerization catalyst, in the proportions recited to obtain in the form of a viscous solution a copolymer consisting of from about 20–80% by weight of the methacrylamide or methacrylic acid and from 80–20% by weight of the hydrochloride salt of a vinyl pyridine or an N,N-dialkyl aminoethyl acrylate. When the proportions of the materials making up the hydrophilic copolymer are outside the ranges specified, the hydrosols prepared therefrom are unsatisfactory. In preparing the hydrophilic copolymer, the concentrations of the monomers in water can be varied within any practical range, as for example from about 2% to about 40%, but advantageously from about 10 to about 30% based on the total weight of the polymerization reaction mixture. The polymerization is desirably carried substantially to completion, i. e. to a point where at least 95% of the monomers originally present have copolymerized, in order that the resulting solution can be used without the necessity of isolating and purifying the resulting hydrophilic copolymer. The hydrophilic copolymers which are obtained as viscous solutions usually contain the components in approximately the same ratio as were present in the original starting mixture of monomers. The copolymers are usually used after being diluted with water, and the solutions can be used directly or the copolymers can be isolated by precipitation or other means, then dried as desired. The copolymers are stable indefinitely in the dry state and may be conveniently redissolved in water when needed.

The viscous solution of hydrophilic copolymer is then subjected to a second and final stage of polymerization wherein the mentioned hydrophobic monomer mixtures consisting of 10–90%, and preferably 30–70%, of the acrylic ester and from 90–10%, and preferably 70–30%, by weight of styrene, acrylonitrile, or other hydrophobic monomer are added to the viscous solution in the ratio of 5–40 parts by weight of the hydrophilic copolymer to 95–60 parts by weight of the hydrophobic monomer mixture. The polymerization is then continued until the added monomers have substantially polymerized to produce the hydrosols of this invention. When proportions are employed outside the above-stated ranges, satisfactory hydrosols are not obtained. The exact mechanism by which the hydrophilic copolymer functions in promoting combination with the hydrophobic monomers to form the stable compatible hydrosols of the invention is not clearly understood. The resulting final polymer in the hydrosols functions as a single unitary polymer, however, without separation of components so that the hydrosols can be considered as chemically bonded, resinous combinations of both hydrophilic and hydrophobic units.

The polymerizations according to the invention may be accelerated by heat, by actinic light such as ultraviolet, but preferably by the use of peroxide polymerization catalysts such as acetyl peroxide, benzoyl peroxide, hydrogen peroxide, sodium persulfate, potassium persulfate, ammonium persulfate, sodium perborate, potassium borate, and the like. The water-soluble catalysts such as potassium and sodium persulfates are preferred. Mixtures of catalysts can be employed. The amount of catalyst can be varied advantageously from about 0.01 to 2.0%, based on the total weight of monomers to be polymerized. The catalyst can be added in the first step of polymerization in sufficient amount to catalyze the second step also, but usually a portion of the catalyst is added for each step of polymerization. The temperature of the polymerizations in both steps can be varied from about 30° to 100° C. and even higher if pressures above atmospheric are employed, but preferably from about 75° to 90° C. Pressures less than atmospheric can also be employed. The process may be conducted in batch or continuous manner. Where a continuous process is employed, the monomers and substituents making up the reaction mixture in either step of polymerization can be added to the reaction mixture in continuous manner and the resulting products withdrawn from the system as formed.

A preferred process for preparing the hydrosols of the invention, as illustrated in Example 1, is to first make up an aqueous solution of the basic monomer, adjust the pH to about 2–3 with concentrated hydrochloric acid, and then add to the resulting salt solution the methacrylamide or methacrylic acid and potassium persulfate to form a polymerization mixture which is thereafter heated until a clear viscous solution of the hydrophilic copolymer is obtained. Depending upon whether methacrylamide or methacrylic acid is employed, the hydrophilic polymer will be either cationic or ampholytic. The hydrophilic copolymer solution is usually diluted with water to facilitate handling in the succeeding polymerization. A portion of the diluted solution is placed in a flask and heated to about 80–90° C. Additional catalyst can be added if desired. While stirring the solution in the flask, there are added slowly and concurrently thereto the separated portion of the hydrophilic copolymer solution through one funnel and the mixture of hydrophobic monomers through another funnel. After the addition has been completed, the polymerization is allowed to continue until the added monomers have substantially polymerized to form the hydrosol. The hydrophilic copolymer permits the emulsion polymerization to proceed satisfactorily without the use of any other surfactant. The cooled and filtered hydrosol prepared by this procedure contains no coagulum and shows good compatibility with gelatin. In most cases the compatibility extends over the pH range of 3 to 9, although with certain of the ampholytic hydrosols, there may be some incompatibility and coagulation in the range of 4.5 to 6.5. Any coagulation in this range can be readily overcome by merely changing the pH to a value outside the range whereupon the coagulated polymer redissolves. The hydrosols thus prepared give clear flexible coatings on surfaces when dried, either alone or when admixed with gelatin or other natural colloid.

In the above-described preferred process, the simultaneous addition of part of the hydrophilic copolymer solution and the mixture of monomers provides fresh polymer loci to which the hydrophobic monomers can attach during the polymerization. Addition of the full amount of monomers to the full amount of copolymer solution appears to exhaust the copolymer loci too quickly, and the hydrosols thus obtained, although useful, are not quite as uniform and satisfactory for photographic purposes as those obtained by the simultaneous addition process.

In practicing the invention, the hydrophilic copolymer can be any copolymer containing 20–80% by weight of methacrylamide or methacrylic acid and conversely 80–20% by weight of a salt, preferably a hydrochloride salt, of a basic monomer from the group consisting of vinyl pyridines, or N,N-dialkyl aminoethyl acrylates. The vinyl pyridines can be either the unsubstituted vinyl pyridines such as 4-vinyl pyridine, 2-vinyl pyridine, or 3-vinyl pyridine, or the nuclearly alkylated vinyl pyridines wherein an alkyl group of 1–2 carbon atoms is joined directly to the nucleus. Both types of compounds are included within the scope of the term vinyl pyridine monomers as used herein. Such alkylated vinyl pyridines include 2-methyl-5-vinyl pyridine and 5-ethyl-2-vinyl pyridine. The N,N-dialkyl aminoethyl acrylates suitable for use in practicing the invention are the N,N-dimethyl and the N,N-diethyl aminoethyl acrylates.

The ampholytic or cationic hydrophilic copolymer can be reacted as described with any mixture of at least two hydrophobic monomers wherein from 10 to 90% by weight of the mixture consists of an acrylic ester from the group consisting of alkyl acrylates and alkyl methacrylates wherein each alkyl group contains 1–4 carbon atoms. The remainder of the hydrophobic monomer mixture can be any of the other well known hydrophobic monomers but is desirably styrene, acrylonitrile, butadiene or vinylidene chloride. Such other hydrophobic monomers as alkylated styrenes, methacrylonitrile, isoprene, and the like can also be used, although not with the same degree of utility as the preferred hydrophobic monomers.

The following examples illustrate the practice of the invention without limitation thereof. Examples 1-7 are concerned with hydrosols prepared from ampholytic hydrophilic copolymers, and Examples 8-19 are concerned with hydrosols prepared from cationic hydrophilic copolymers.

*Example 1*

A mixture of 16.6 g. of β - N,N - diethylaminoethyl acrylate and 100 ml. of distilled water was adjusted to pH 2.5 with concentrated hydrochloric acid while maintaining the temperature of the mixture at 20–25° C. Then, 8.3 g. of methacrylic acid and 0.25 g. of potassium persulfate were added, and the solution was heated on a steam bath for 1½ hours. A clear, viscous polymer solution was obtained. This polymer solution was divided into two equal parts. One part was placed in a 1-liter, three-necked flask, equipped with a thermometer, a mixer, and two dropping funnels. This polymer solution was diluted with 300 ml. of distilled water and heated to 80°. Then 0.63 g. of potassium persulfate was added. Into the two dropping funnels were placed, respectively, the other part of the polymer solution, diluted with 100 ml. of distilled water, and a mixture of 71 g. of n-butyl acrylate and 31 g. of styrene. The contents of the dropping funnels were added simultaneously, dropwise with stirring, over a 25-minute period, to the reaction flask. The contents of the reaction flask were maintained at 80–82° C. during the monomer addition and for one hour thereafter. The hydrosol was then cooled and filtered through a cloth filter. Essentially complete polymerization was obtained, yielding an opaque hydrosol having no coagulation. This hydrosol had a pH of 2.2, but could be raised and lowered in pH at will with no coagulum. The hydrosol on coating dried to give a clear, transparent film. A sample of the hydrosol was diluted with an equal volume of distilled water, mixed 1:1 with pigskin gelatin and coated at pH 3.0, 4.0, 5.0, 6.0, 7.0, and 8.0. All coatings dried to give clear, transparent films.

*Example 2*

The procedure used was identical to that listed under Example 1. However, the hydrophobic monomer combination consisted of 71 g. of n-butyl acrylate and 31 g. of acrylonitrile. The hydrosol obtained had properties similar to those of the hydrosol described in Example 1.

*Example 3*

The procedure used was identical to that listed under Example 1. However, the hydrophobic monomer combination consisted of 80 g. of ethyl acrylate and 34 g. of styrene, and the monomer combination used to prepare the hydrophilic copolymer consisted of 8.3 g. of β-N,N-diethylaminoethyl acrylate and 4.1 g. of methacrylic acid. The hydrosol obtained had properties similar to those of the hydrosol described in Example 1.

*Example 4*

The procedure used was identical to that listed under Example 1. However, the hydrophobic monomer combination consisted of 108.5 g. of ethyl acrylate and 12.1 g. of acrylonitrile, and the monomer combination used to prepare the hydrophilic copolymer consisted of 4.2 g. of β-N,N-diethylaminoethyl acrylate and 2.2 g. of methacrylic acid. The hydrosol obtained had properties similar to those of the hydrosol described in Example 1.

*Example 5*

The procedure used was identical to that listed under Example 1. However, the monomer combination used to prepare the hydrophilic copolymer consisted of 15.2 g. of 5-ethyl-2-vinylpyridine and 9.8 g. of methacrylic acid. Essentially complete polymerization was obtained, yielding an opaque hydrosol having no coagulation. The hydrosol had a pH of 2.2. When the pH of this was raised with dilute ammonium hydroxide solution to pH 4.5, a curdy precipitate began to come out of suspension. This condition continued until pH 6.5 was reached at which time the precipitate disappeared and a good hydrosol was again obtained. This condition was again observed in the range of pH 6.5 to 4.5 when the hydrosol at high pH was lowered with dilute hydrochloric acid. The hydrosol was not compatible with pigskin gelatin in the pH range 4.5 to 6.5, but was compatible outside this range.

*Example 6*

The procedure used was identical to that listed under Example 1. However, the hydrophobic monomer combination consisted of 80 g. of n-butyl acrylate and 34 g. of styrene, and the monomer combination used to prepare the hydrophilic copolymer consisted of 13.7 g. of 4-vinylpyridine and 11.2 g. of methacrylic acid. The hydrosol obtained had properties similar to those of the hydrosol described in Example 5.

*Example 7*

A mixture of 13.2 g. of β-N,N-diethylaminoethyl acrylate, 6.2 g. of methacrylamide, and 100 ml. of distilled water was adjusted to pH 2.5 while maintaining the temperature at 80–82° C. Then 5.5 g. of acrylic acid and 0.25 g. of potassium persulfate were added, and the solution was heated on a steam bath for 1½ hours. A clear, viscous polymer solution was obtained. This polymer solution was divided into two equal parts. One part was diluted with 300 ml. of distilled water and heated to 80° C. in a 1-liter, three-necked flask, equipped with a thermometer, a mixer, and two dropping funnels. Then 0.63 g. of potassium persulfate was added. Into the two dropping funnels were placed, respectively, the other part of the polymer solution, diluted with 100 ml. of distilled water, and a mixture of 71 g. of n-butyl acrylate and 31 g. of styrene. The contents of the dropping funnels were added simultaneously, dropwise with stirring, over a 25-minute period, to the reaction flask. The contents of the reaction flask were maintained at 80–82° C. during the monomer addition and for one hour thereafter. The hydrosol was cooled and filtered through a cloth filter. The hydrosol obtained had properties similar to those of the hydrosol described in Example 1.

*Example 8*

A mixture of 18.75 g. of diethylaminoethyl acrylate, 6.25 g. of methacrylamide and 100 ml. of distilled water was adjusted to pH 2.5 with conc. hydrochloric acid while maintaining the mixture between 20–25° C. Then 0.25 g. of potassium persulfate was added, and the solution heated on a steam bath for 2 hours. A viscous, clear polymer solution was obtained. This polymer solution was divided into two equal parts. On part was placed in a 1-liter three-necked flask and was diluted with 300 ml. of distilled water and heated to 80°. Then 0.63 g. of potassium persulfate was added. Into the two dropping funnels were placed, respectively, the other part of the polymer solution, diluted with 100 ml. of distilled water, and a mixture of 71 g. of n-butyl acrylate and 31 g. of acrylonitrile. The contents of the dropping funnels were added simultaneously dropwise with stirring, over a 25-minute period, to the reaction flask. The contents of the reaction flask were maintained at 80–82° during the monomer addition and for one hour thereafter. The hydrosol was then cooled and filtered through a cloth filter. The opaque hydrosol contained no coagulum, was stable, and was compatible when coated 1:1 with pigskin gelatin. The pH of the gelatin-hydrosol mixture could be raised or lowered at will and coatings made at pH 3.0, 5.0, 7.0, and 9.0 dried to give clear, colorless, transparent flexible films.

Example 9

The procedure used was identical to that listed under Example 8. However, the hydrophobic monomer combination consisted of 71 g. of n-butyl acrylate and 31 g. of styrene. The hydrosol obtained had properties similar to those of the hydrosol described in Example 8.

Example 10

The procedure used was identical to that listed under Example 8. However, the monomer combination used to prepare the hydrophilic copolymer consisted of 18.75 g. of 4-vinylpyridine and 6.25 g. of methacrylamide. The hydrosol obtained had properties similar to those of the hydrosol described in Example 8.

Example 11

The procedure used was identical to that listed under Example 8. However, the monomer combination used to prepare the hydrophilic copolymer consisted of 18.75 g. of 2-methyl-5-vinyl pyridine and 6.25 g. of methacrylamide. The hydrosol obtained had properties similar to those of the hydrosol described in Example 8.

Example 12

The procedure used was identical to that listed under Example 8. However, the monomer combination used to prepare the hydrophilic copolymer consisted of 18.75 g. of 2-vinyl-5-ethyl pyridine and 6.25 g. of methacrylamide. The hydrosol obtained had properties similar to those of the hydrosol described in Example 8.

Example 13

The procedure used was identical to that listed under Example 8. However, the hydrophobic monomer combination consisted of 71 g. of ethyl acrylate and 31 g. of styrene, and the monomer combination used to prepare the hydrophilic copolymer consisted of 18.75 g. of 2-vinyl-5-methylpyridine and 6.25 g. of methacrylamide. The hydrosol obtained had properties similar to those of the hydrosol described in Example 8.

Example 14

The procedure used was identical to that listed under Example 8. However, the hydrophobic monomer combination consisted of 71 g. of ethyl acrylate and 31 g. of styrene. The hydrosol obtained had properties similar to those of the hydrosol described in Example 8.

Example 15

The procedure used was identical to that listed under Example 8. However, the hydrophobic monomer combination consisted of 71 g. of ethyl acrylate and 31 g. of styrene, and the monomer combination used to prepare the hydrophilic copolymer consisted of 18.75 g. of 2-vinyl-5-ethylpyridine and 6.25 g. of methacrylamide. The hydrosol obtained had properties similar to those of the hydrosol described in Example 8.

Example 16

The procedure used was identical to that listed under Example 8. However, the hydrophobic monomer combination consisted of 71 g. of ethyl acrylate and 31 g. of styrene, and the monomer combination used to prepare the hydrophilic copolymer consisted of 18.75 g. of 4-vinylpyridine and 6.25 g. of methacrylamide. The hydrosol obtained had properties similar to those of the hydrosol described in Example 8.

Example 17

The procedure used was identical to that listed under Example 8. However, the hydrophobic monomer combination consisted of 80 g. of n-butyl acrylate and 34 g. of acrylonitrile, and the monomer combination used to prepare the hydrophilic copolymer consisted of 9.37 g. of diethylaminoethyl acrylate and 3.13 g. of methacrylamide. The hydrosol obtained had properties similar to those of the hydrosol described in Example 8.

Example 18

The procedure used was identical to that listed under Example 8. However, the hydrophobic monomer combination consisted of 53 g. of n-butyl acrylate and 23 g. of acrylonitrile, and the monomer combination used to prepare the hydrophilic copolymer consisted of 37.5 g. of diethylaminoethyl acrylate and 12.5 g. of methacrylamide. The hydrosol obtained had properties similar to those of the hydrosol described in Example 8.

Example 19

Into a one-quart, glass, pressure bottle were placed the following materials:

550 ml. of distilled water
1.50 g. of sodium thiosulfate pentahydrate
2.00 g. of potassium persulfate
62.5 g. of a methacrylamide-diethylaminoethyl acrylate hydrochloride copolymer solution, prepared as in Example 8
69 g. of ethyl acrylate
69 g. of vinylidene chloride The bottle was then swept out with nitrogen, sealed with a crown and tumbled at 102–105° F. (39–41° C.) for 20 hours. An opaque hydrosol, containing little coagulum was obtained.

The coated films prepared in accordance with this invention by employing equal mixtures of gelatin and any of the hydrosols herein described applied on a clear cellulose acetate film support are clear and flexible when the coated film is dried and conditioned at 77° F. and a relative humidity of 15%. The increased flexibility of the coatings increases the number of folds without rupture which the coated film can undergo more than 100%.

The hydrosols embodying the invention are particularly useful in photographic applications, either alone or in admixture with gelatin, for backing layers on photographic films to prevent back reflection of light from the film support on exposure, as subbing layers for bonding the film support and emulsion layer together, as carriers for silver halides in photosensitive emulsion layers, as overcoating layers to protect the sensitized face of photographic film, as materials for incorporation into light filter layers in photographic films and the like. In general, the hydrosols of the invention can be used in either color or black-and-white photographic applications. They are also useful as tub or beater size in photographic paper raw stock, in the baryta layer of certain photographic paper stock as adhesives, in sensitized emulsions employed for coating such paper stock, in overcoatings over sensitized paper emulsions, and the like.

Although the invention has been described in detail with particular reference to certain preferred embodiments thereof, variations and modifications can be effected within the spirit and scope of the invention as described hereinabove and as defined in the appended claims.

1 claim:

1. A process for preparing a hydrosol which is compatible with gelatin which comprises heating a mixture of water, a peroxide polymerization catalyst, a copolymer of 20–80% by weight of a member of the group consisting of methacrylamide and methacrylic acid and 80–20% by weight of a hydrochloride salt of a basic monomer from the group consisting of vinyl pyridines and N,N-dialkyl aminoethylacrylates, wherein each alkyl group contains 1–2 carbon atoms, and a mixture of monomers consisting of 10–90% by weight of acrylic ester from the group consisting of alkyl acrylates and alkyl methacrylates wherein each alkyl group contains 1–4 carbon atoms and 90–10% by weight of hydrophobic monomer from the group consisting of styrene, acrylonitrile, butadiene and vinylidene chloride, said copolymer amounting to 5–40% and said mixture of monomers amounting to 60–95% of the combined weight of said copolymer and said monomers.

2. A hydrosol obtained by the process of claim 1.

3. A compatible mixture of gelatin and a hydrosol obtained by the process of claim 1.

4. A process for preparing a hydrosol which is compatible with gelatin which comprises heating a mixture of water, a peroxide polymerization catalyst, a cationic hydrophilic copolymer of 20–80% by weight of methacrylamide and 80–20% by weight of a hydrochloride salt of a basic monomer from the group consisting of vinyl pyridines and N,N-dialkyl aminoethyl acrylates wherein each alkyl group contains 1–2 carbon atoms, and a mixture of monomers consisting of 10–90% by weight of an alkyl acrylate wherein the alkyl group contains 1–4 carbon atoms and 90–10% by weight of styrene, said copolymer amounting to 5–40% and said mixture of monomers amounting to 60–95% of the combined weight of said copolymer and said monomers.

5. A hydrosol obtained by the process of claim 4.

6. A process for preparing a hydrosol which is compatible with gelatin which comprises heating a mixture of water, a peroxide polymerization catalyst, a cationic hydrophilic copolymer of 20–80% by weight of methacrylamide and 80–20% by weight of a hydrochloride salt of a basic monomer from the group consisting of vinyl pyridines and N,N-dialkyl aminoethyl acrylates wherein each alkyl group contains 1–2 carbon atoms, and a mixture of monomers consisting of 10–90% by weight of an alkyl acrylate wherein the alkyl group contains 1–4 carbon atoms and 90–10% by weight of acrylonitrile, said copolymer amounting to 5–40% and said mixture of monomers amounting to 60–95% of the combined weight of said copolymer and said monomers.

7. A hydrosol obtained by the process of claim 6.

8. A process for preparing a hydrosol which is compatible with gelatin which comprises heating a mixture of water, a peroxide polymerization catalyst, an ampholytic hydrophilic copolymer of 20–80% by weight of methacrylic acid and 80–20% by weight of a hydrochloride salt of a basic monomer from the group consisting of vinyl pyridines and N,N-dialkyl aminoethyl acrylates wherein each alkyl group contains 1–2 carbon atoms, and a mixture of monomers consisting of 10–90% by weight of an alkyl acrylate wherein the alkyl group contains 1–4 carbon atoms and 90–10% by weight of styrene, said copolymer amounting to 5–40% and said mixture of monomers amounting to 60–95% of the combined weight of said copolymer and said monomers.

9. A hydrosol obtained by the process of claim 8.

10. A process for preparing a hydrosol which is compatible with gelatin which comprises heating a mixture of water, a peroxide polymerization catalyst, an ampholytic hydrophilic copolymer of 20–80% by weight of methacrylic acid and 80–20% by weight of a hydrochloride salt of a basic monomer from the group consisting of vinyl pyridines and N,N-dialkyl aminoethyl acrylates wherein each alkyl group contains 1–2 carbon atoms, and a mixture of monomers consisting of 10–90% by weight of an alkyl acrylate wherein the alkyl group contains 1–4 carbon atoms, and 90–10% by weight of acrylonitrile, said copolymer amounting to 5–40% and said mixture of monomers amounting to 60–95% of the combined weight of said copolymer and said monomers.

11. A hydrosol obtained by the process of claim 10.

12. A process for preparing a hydrosol which is compatible with gelatin which comprises heating a mixture of water, a peroxide polymerization catalyst, a copolymer of 20–80% by weight of methacrylamide and 80–20% by weight of N,N-diethyl aminoethyl acrylate hydrochloride, and a mixture of monomers consisting of 10–90% by weight of n-butyl acrylate and 90–10% by weight of acrylonitrile, said copolymer amounting to 5–40% and said mixture of monomers amounting to 95–60% of the combined weight of said copolymer and said monomers.

13. A process for preparing a hydrosol which is compatible with gelatin which comprises heating a mixture of water, a peroxide polymerization catalyst, a copolymer of 20–80% by weight of methacrylamide and 80–20% by weight of N,N-diethyl aminoethyl acrylate hydrochloride, and a mixture of monomers consisting of 10–90% by weight of n-butyl acrylate and 90–10% by weight of styrene, said copolymer amounting to 5–40% and said mixture of monomers amounting to 95–60% of the combined weight of said copolymer and said monomers.

14. A process for preparing a hydrosol which is compatible with gelatin which comprises heating a mixture of water, a peroxide polymerization catalyst, a copolymer of 20–80% by weight of methacrylic acid and 80–20% by weight of N,N-diethyl aminoethyl acrylate hydrochloride, and a mixture of monomers consisting of 10–90% by weight of n-butyl acrylate and 90–10% by weight of styrene, said copolymer amounting to 5–40% and said mixture of monomers amounting to 95–60% of the combined weight of said copolymer and said monomers.

15. A process for preparing a hydrosol which is compatible with gelatin which comprises heating a mixture of water, a peroxide polymerization catalyst, a copolymer of 20–80% by weight of methacrylic acid and 80–20% by weight of a vinyl pyridine hydrochloride, and a mixture of monomers consisting of 10–90% by weight of n-butyl acrylate and 90–10% by weight of styrene, said copolymer amounting to 5–40% and said mixture of monomers amounting to 95–60% of the combined weight of said copolymer and said monomers.

16. A process for preparing a hydrosol which is compatible with gelatin which comprises heating a mixture of water, a peroxide polymerization catalyst, a copolymer of 20–80% by weight of methacrylamide and 80–20% by weight of a vinyl pyridine hydrochloride, and a mixture of monomers consisting of 10–90% by weight of ethyl acrylate and 90–10% by weight of styrene, said copolymer amounting to 5–40% and said mixture of monomers amounting to 95–60% of the combined weight of said copolymer and said monomers.

No references cited.